Jan. 8, 1963  D. E. CARR  3,071,924
METHOD OF COMBUSTION UTILIZING OZONE
Filed Feb. 3, 1959
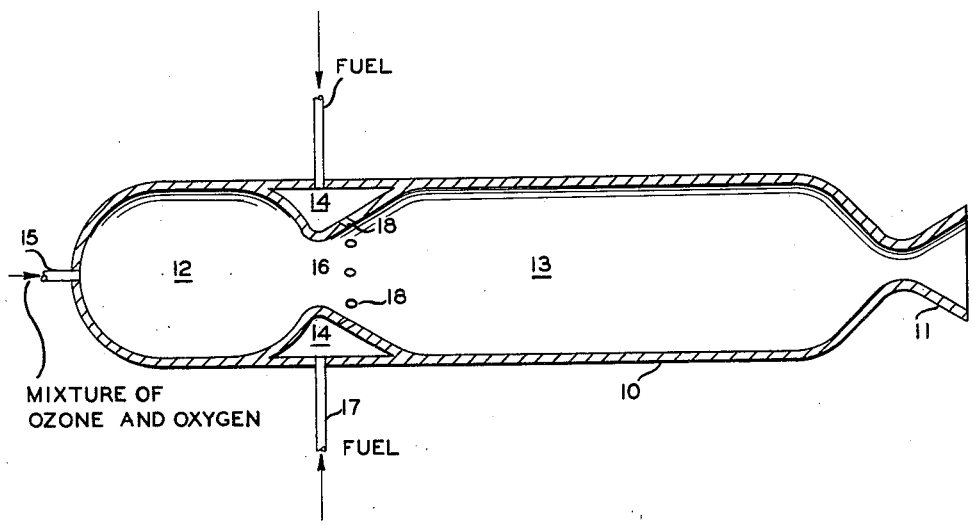
INVENTOR.
D. E. CARR
BY Hudson and Young
ATTORNEYS

United States Patent Office 3,071,924
Patented Jan. 8, 1963

3,071,924
METHOD OF COMBUSTION UTILIZING OZONE
Donald E. Carr, Bartlesville, Okla., assignor to Phillips Petroleum Company, a corporation of Delaware
Filed Feb. 3, 1959, Ser. No. 790,930
2 Claims. (Cl. 60—35.4)

This invention relates to a combustion process. In one of its aspects, the invention relates to a combustion process in which ozone and oxygen are combusted together to yield oxygen which then can be used to support a later combustion. In another aspect, the invention relates to a two-stage method for operating a rocket motor, wherein ozone is consumed in two stages, by, in a first stage, combusting ozone and oxygen and, in a second stage, utilizing the oxygen thus obtained to burn a fuel. In a further aspect, the invention provides a two-stage combustion rocket engine in which, in a first stage, ozone is combusted with oxygen to yield oxygen which is used in a second stage to burn a suitable fuel. In a further aspect of the invention, the final gases can be used to generate power as in the driving of a turbine. In an especial further aspect, the combusted ozone and oxygen mixture can be mixed with air in a ram jet engine and then with fuel to power the engine.

In recent years, increasing attention has been given to use of ozone as a component of bipropellant mixtures. Ozone has been recognized as a substitute for oxygen. Further, recognition has been made of the fact that when ozone is used to oxidize a fuel, the flame temperatures are higher than those achieved with an equivalent amount of oxygen. This is attributed to the fact that when ozone is employed there occurs an exothermic reaction represented by the equation $$O_3 \rightarrow 1.5\ O_2 + 33.92\ \text{kcal./mol.}$$

The energy released by this reaction is available to increase the temperature of the flame.

I have recognized that pure ozone is not a satisfactory fuel. There are many disadvantages for the direct combustion of fuels with ozone. The higher flame temperatures can be a disadvantage, especially if additional cooling is required to maintain the walls of the combustion chamber at a safe level. Mixtures of ozone and organic fuels constitute a very dangerous combination. These and other disadvantages are minimized or eliminated by the practice of this invention.

An object of the invention is to provide an improved combustion process. Another object of the invention is to provide an improved combustion of ozone. Another object of the invention is to provide an improved plural-stage combustion of ozone. A further object is to provide a method for the operation of a rocket engine. A further object is to provide a method for the operation of a plural-stage rocket engine to which ozone, oxygen and a fuel are fed. It is a further object of this invention to avoid the dangers inherent in bringing together ozone and a combustible fuel.

Other aspects, objects and the several advantages of this invention are apparent from a study of this disclosure, the drawing and the appended claims.

According to the invention, there is provided an improved method for the combustion of ozone wherein ozone is combusted with oxygen in a first stage to yield oxygen which is then combusted in a second stage together with a fuel.

Also according to the present invention, there is provided a method for the operation of a rocket engine which comprises, in a first stage, combusting together ozone and oxygen to yield oxygen which then is admixed with a fuel and burned therewith in a second stage of the engine.

In the practice of this invention, the ozone is burned in two stages, as noted. In the first stage, the reaction is believed to be represented by the equation as given above. To effect this reaction, the ozone is mixed with oxygen so as to give a gaseous mixture containing between them 20 and 54 parts by weight of ozone per 100 parts total ozone and oxygen and, more preferably, between 25 and 48 parts by weight of ozone per 100 parts total ozone and oxygen. Preferably the ozone and oxygen employed are relatively pure so that other components in the mixture amount to not more than 10 weight percent of the total mixture. Thus, the oxygen can be supplied in part from air provided the total nitrogen and other gases supplied with the air amount to less than about 10 weight percent of the mixture. At concentrations of ozone below those described above, self-sustaining combustion is not ordinarily achieved in a conventional reaction or combustion zone; at higher concentrations detonation can occur. All the oxygen is subsequently available for combustion of a suitable fuel. The ozone-oxygen mixture can be readily ignited by a hot wire or a spark. A smooth-burning flame results. The hot gases from combustion of the fuel can be made to do work, as subsequently described, by expansion through a nozzle.

In the second step of this combustion process, the hot oxygen stream resulting from the combustion of the ozone-oxygen mixture is mixed with a suitable fuel to form a combustible mixture. Suitable fuels include various hydrocarbons and mixtures of hydrocarbons, such as hexane, n-octane and the jet fuels (e.g., JP-4, JP-6). Other high energy fuels suitable for use with oxygen are known and can be employed. For example, hydrogen, ammonia, cyanogen and the boranes, such as pentaborane, can be employed. Stoichiometric or near stoichiometric mixtures of the oxidant and fuel are preferred to obtain maximum values for the specific impulse of the propellant mixture. However, satisfactory performance is readily achieved with oxidant to fuel ratios which are 0.75 to 1.25 times the stoichiometric ratio.

The practice of this invention is further illustrated by an embodiment thereof which is diagrammatically shown in the drawing. In the drawing, there is shown a combustion chamber 10, of a rocket motor with attached nozzle, 11. The combustion chamber is divided into two connected compartments 12 and 13. A mixture of ozone and oxygen is admitted to compartment 12 via line 15. The mixture is ignited by an ignition means, such as a hot wire not shown, and burned to oxygen in said compartment 12. The hot gases are forced into compartment 13 via a converging-diverging nozzle 16. The gases attain a high velocity in the throat of the nozzle 16. This high velocity facilitates uniform admixture with a fuel entering from line 17 leading to a preheater compartment 14 and feed nozzles 18. Sustained and uniform combustion of the fuel and oxygen is achieved in chamber 13. The hot combustion gases are exhausted through nozzle 11 to develop thurst.

The mixture of ozone and oxygen which is introduced into the chamber 12 is preferably a gaseous mixture. Such a mixture can be obtained from vaporization of a liquid mixture of ozone and oxygen or by blending liquid streams of the two gases, for example, in pipe 15, subsequently vaporizing the liquid mixture into the engine. The heat required for the vaporization of the liquefied gases can be utilized to effect cooling of the nozzle by means, not shown.

In another embodiment of this invention, the hot gases generated in compartment 13 are employed to drive a turbine and thereby generate mechanical power.

In still another embodiment of this invention, the disclosed combustion process is utilized in a ram jet wherein the ozone-oxygen mixture is used to generate hot gaseous oxygen which is admixed with rammed air. The air is thus heated and then mixed with the fuel.

Other embodiments of this invention will be apparent to those skilled in the art upon reading of this disclosure. Thus, solid fuels can be used as the fuel in the second stage of the engine and these can include boron, magnesium, aluminum and calcium. Also, certain plastics or synthetic organics, such as polyethylene, polypropylene and others, can be used.

These fuels are conveniently employed as powdered solids, and as solutions or suspensions in a suitable liquid medium. Particularly suitable liquid media include the liquid fuels previously named and the like. For example, powdered aluminum or solid polymers of ethylene, are suspended in hexane, jet fuels or kerosene; and the suspension is injected into the combustion chamber. The liquid and solid polymers of the 1-olefins as well as other polymeric fuels are readily dissolved in organic solvents. For example, the solid polymers of ethylene can be dissolved in cyclohexane and in tetralin.

Reasonable variation and modification are possible within the scope of the foregoing disclosure, the drawing and the appended claims to the invention, the essence of which is that there has been provided a two-stage utilization of ozone as a combustion supporting medium which comprises, in a first stage, combusting ozone with oxygen or a medium consisting essentially of oxygen and then, in a second stage, utilizing the oxygen containing medium thus produced to combust a fuel, substantially and essentially as described.

I claim:

1. A method of operating a rocket engine which comprises, in a first section thereof, combusting ozone and oxygen to yield an oxygen containing gas, passing said oxygen containing gas, together with a suitable fuel selected from the group consisting of a hydrocarbon, mixtures of hydrocarbons, hydrogen, ammonia, cyanogen, a borane, boron, magnesium, aluminum, calcium, liquid and solid polyethylene, liquid and solid polypropylene, polymers of 1-olefins, and polymers of 1-olefins dissolved in a solvent such as cyclohexane and tetralin, into a second section of said rocket engine and, in said second section of said engine, combusting said fuel with said oxygen and then discharging combustion gases from said second section of said rocket engine.

2. A method of operating a rocket engine which comprises supplying liquid ozone and liquid oxygen to a rocket engine, in said engine heating and vaporizing and mixing said liquid oxygen and ozone to produce combustion thereof to yield oxygen, then admixing with the oxygen thus produced a fuel selected from the group consisting of a hydrocarbon, mixtures of hydrocarbons, hydrogen, ammonia, cyanogen, a borane, boron, magnesium, aluminum, calcium, liquid and solid polyethylene, liquid and solid polypropylene, polymers of 1-olefins, and polymers of 1-olefins dissolved in a solvent such as cyclohexane and tetralin capable of being combusted by said oxygen thus produced and combusting said fuel and then discharging gases thus produced through a nozzle of said engine.

References Cited in the file of this patent

UNITED STATES PATENTS

| | | |
|---|---|---|
| 2,648,317 | Mikulasek et al. | Aug. 11, 1953 |
| 2,689,454 | Schneider | Sept. 21, 1954 |
| 2,704,274 | Allison | Mar. 15, 1955 |
| 2,706,887 | Grow | Apr. 26, 1955 |
| 2,864,233 | Tschinkel | Dec. 16, 1958 |
| 2,887,844 | Coty | May 26, 1959 |
| 2,893,203 | Carmody et al. | July 7, 1959 |

OTHER REFERENCES

Journal of the American Rocket Society, No. 72, December 1947, pp. 17, 19, 21.